(12) United States Patent
Rau, III et al.

(10) Patent No.: US 7,407,354 B2
(45) Date of Patent: *Aug. 5, 2008

(54) CORROSION-RESISTANT METAL FASTENERS AND STUD INSERTS

(75) Inventors: Charles Benjamin Rau, III, Gig Harbor, WA (US); Dennis M. Burrell, University Place, WA (US)

(73) Assignee: Benmaxx, LLC, Tacoma, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/299,045

(22) Filed: Dec. 9, 2005

(65) Prior Publication Data

US 2006/0239792 A1    Oct. 26, 2006

Related U.S. Application Data

(63) Continuation of application No. 10/654,755, filed on Sep. 4, 2003, now Pat. No. 7,086,705.

(51) Int. Cl.
*B60B 25/00* (2006.01)

(52) U.S. Cl. .................. 411/383; 411/901; 301/35.623

(58) Field of Classification Search ................ 301/115, 301/35.623; 411/383, 242, 433, 900, 901, 411/902, 14; 204/196.18, 196.23, 196.24, 204/196.25; 73/761

See application file for complete search history.

(56) References Cited

U.S. PATENT DOCUMENTS

| | | | | | |
|---|---|---|---|---|---|
| 2,217,086 | A | * | 10/1940 | Whitacre | 301/108.1 |
| 3,060,112 | A | * | 10/1962 | Shomber | 204/196.18 |
| 3,574,080 | A | * | 4/1971 | Jones et al. | 204/196.18 |
| 4,832,413 | A | * | 5/1989 | Waggoner | 301/35.632 |
| 5,029,480 | A | * | 7/1991 | Kibblewhite | 73/761 |
| 5,131,276 | A | * | 7/1992 | Kibblewhite | 73/761 |
| 5,205,176 | A | * | 4/1993 | Kibblewhite | 73/761 |
| 5,220,839 | A | * | 6/1993 | Kibblewhite | 73/761 |
| 5,288,551 | A | * | 2/1994 | Sato et al. | 428/334 |
| 5,655,969 | A | * | 8/1997 | Lat | 470/5 |
| 6,354,152 | B1 | * | 3/2002 | Herlik | 73/597 |
| 7,086,705 | B2 | * | 8/2006 | Rau et al. | 301/35.625 |

OTHER PUBLICATIONS http://global.ihs.com/doc.*

* cited by examiner

*Primary Examiner*—Russell D. Stormer
*Assistant Examiner*—Kip T Kotter
(74) *Attorney, Agent, or Firm*—Barry L. Davidson; Davis Wright Tremaine LLP

(57) ABSTRACT

In the trucking industry, a wheel stud having a recess at either end to accommodate a sacrificial insert of metal higher in the electromotive series of metals than the metals of the wheel stud assembly, the lug and the components joined thereby and being of sufficient difference in color from the surrounding materials so as to be readily visible without disassembling the combination, and a method for its use.

45 Claims, 5 Drawing Sheets

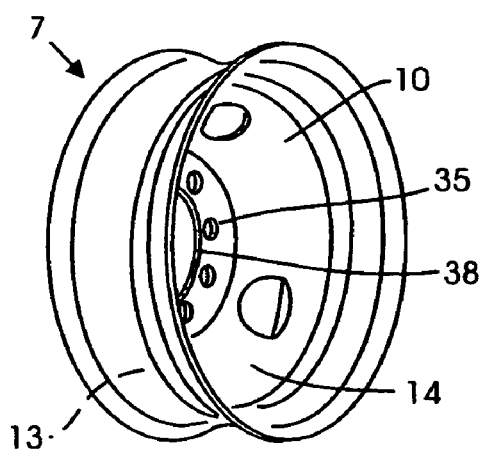
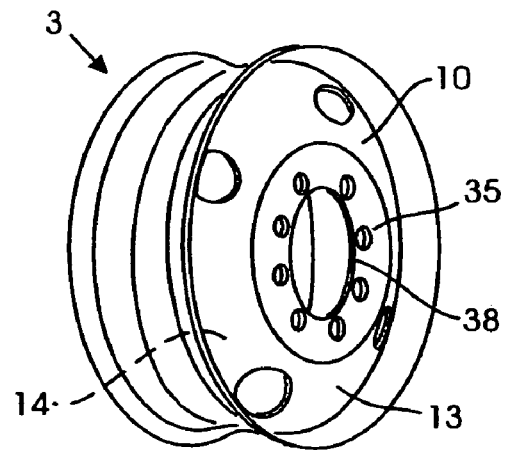
FIG. 3    FIG. 4
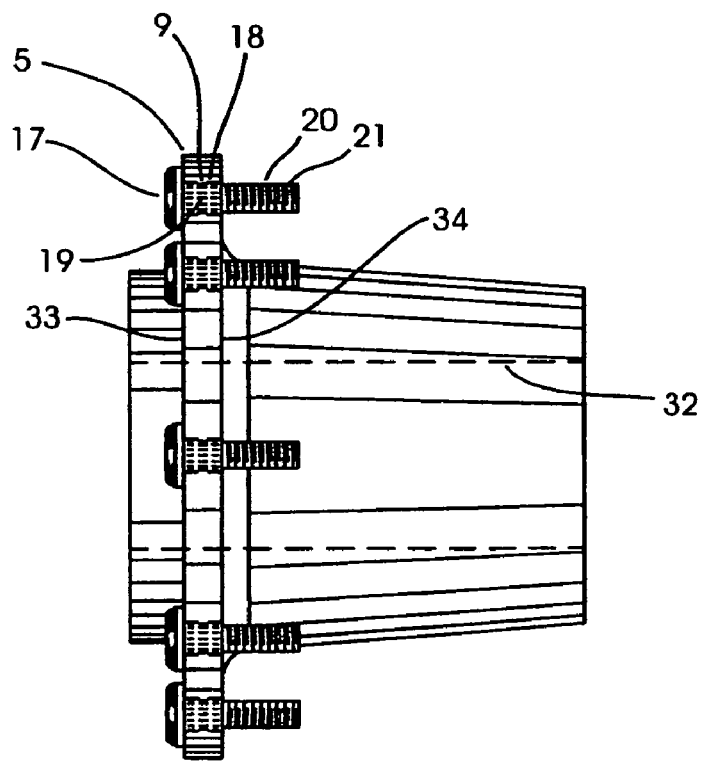
FIG. 5

US 7,407,354 B2

CORROSION-RESISTANT METAL FASTENERS AND STUD INSERTS

CROSS-REFERENCE TO RELATED APPLICATIONS

This application claims the benefit of priority to U.S. application Ser. No. 10/654,755, filed Sep. 4, 2003 now U.S. Pat. No. 7,086,705 and entitled "Zinc Stud Insert," incorporated by reference herein in its entirety.

FIELD OF THE INVENTION

This invention relates generally to fasteners and more particularly to a means for reducing corrosion and binding of wheel assemblies on heavy trucks.

BACKGROUND

The traditional means for removably attaching single or dual wheels to heavy truck axles involves a hub with hardened steel lugs pressed through its circumference which extend through aligned holes in the metal wheel and are secured thereto by single or double lug nuts. These removable components oft times weld together or bind due to corrosion and/or metal transfer, and efforts to separate them result in damage thereto.

Typically, water and road salts in the operating environment aid in the formation of corrosion/rust on the holding thread and/or splines of the wheel studs, so that the lugs become stuck on the wheel studs or the wheel studs become stuck in the hub. As a result, the studs have to be removed and replaced in order to prevent the wheel from becoming detached from the hub.

The use of fasteners with corrosion-inhibiting, fitted washers, such as J. E. Jones U.S. Pat. No. 3,574,080 and K. J. Shomber U.S. Pat. No. 3,060,112, or merely using washers made of non-conductive material between the components of the fastener assembly and the components to be fastened together, are known and utilized in the aviation industry and other high-tech assemblies. The unique arrangement of the components for removably attaching wheels to hubs on an axle of a heavy-duty truck place steel, steel alloys, and other dissimilar metals in close proximity, so a galvanic coupling is set up in the operating environment. The transfer of metal results in such corrosion that the lug can weld to the threaded end of the wheel stud or to the longitudinal splines on the end of the wheel stud pressed into the hub and the hubs corresponding mating splines. The problem of welding or corrosion of these components is that the components may be damaged in order to separate them for regular maintenance. This condition is what gave rise to W. H. Oliver U.S. Pat. No. 3,330,177, an impact cap for the threaded end of the wheel lug, to protect it when it is driven out of the wheel hub.

SUMMARY OF THE INVENTION

Particular aspects of the present invention provide a replaceable stud insert in the stud, at either or both ends, so that the strength of the wheel stud is undiminished, yet the stud insert acts as a sacrificial anode, made from metal higher on the electromotive series of metals, to protect the components of the wheel assembly from corrosion or transfer of metals from galvanic action.

Additional aspects provide the stud insert in a location, and of a color dissimilar to the surrounding metals, to enable easy visual inspection without disassembling the wheel assembly.

As the stud insert is eaten away, it can be re-set, staked, or replaced by pressing in a replacement insert.

Further aspects provide a method of using the stud insert, to include a spherical cavity in the wheel stud, a swaging tool to install the stud insert, and staking the insert at its convex end extending from the end of the stud.

BRIEF DESCRIPTION OF THE DRAWINGS

The invention, both as to its composition and method of operation, together with further objectives and advantages thereof, may best be understood by reference to the following description taken in connection with the accompanying drawings. In the drawings:

FIG. 3 is a quarter side elevation of the concave side of a wheel.

FIG. 4 is a quarter side elevation of the convex side of a wheel.

FIG. 5 is a side elevation of the hub.

DETAILED DESCRIPTION

Figure 1:
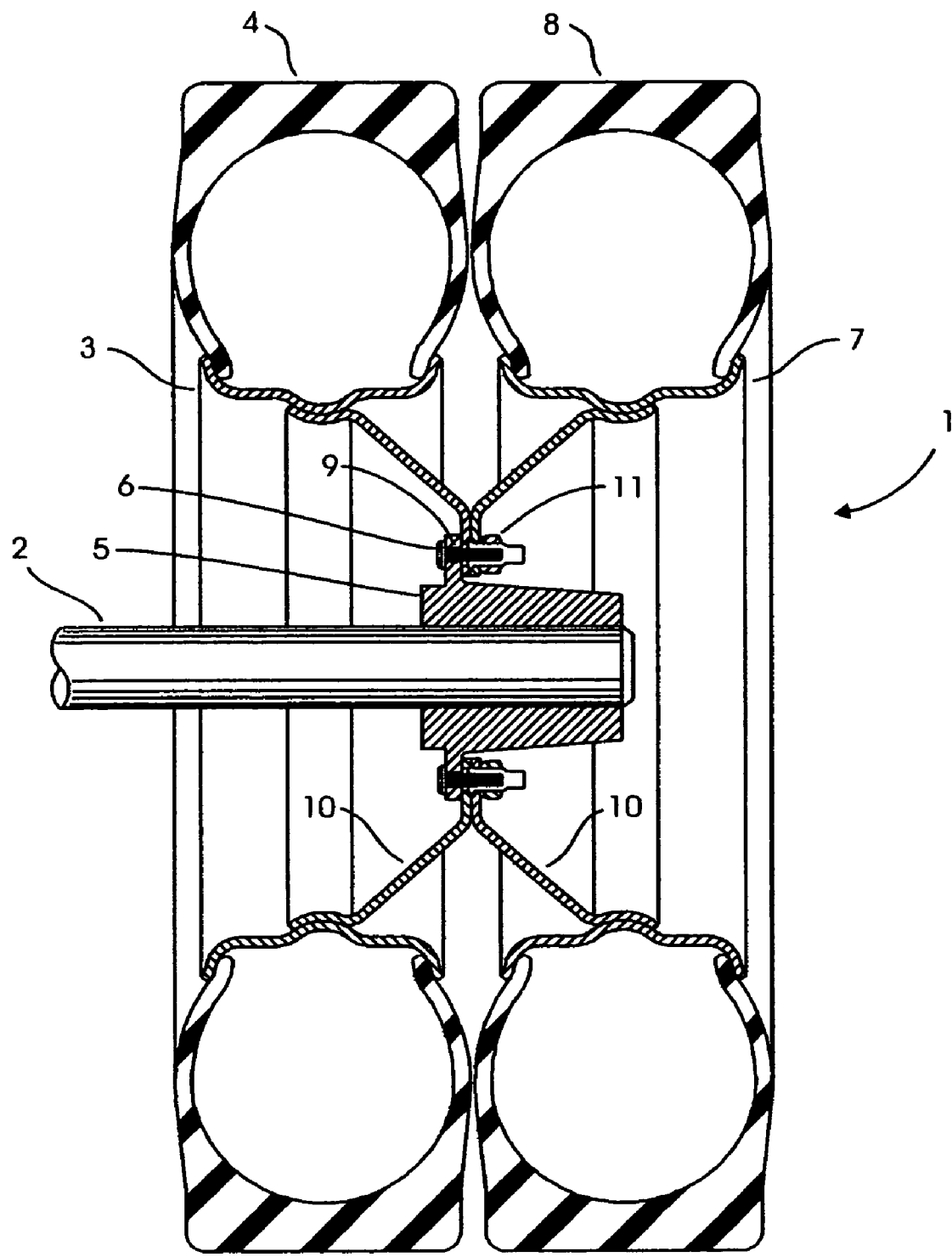
FIG. 1 is a sectional elevational view of one side of a dual wheel assembly.

FIG. 1 shows one side of an axle (2) to which a dual wheel assembly (1) is removably attached, comprised of an inside wheel (3) and tire (4), a hub (5), and outside wheel (7) and tire (8). As shown in FIG. 3, the wheel (3), (7) has a concave face (14) and, in FIG. 4, the wheel (3), (7) has a convex face (13).

Figure 2:
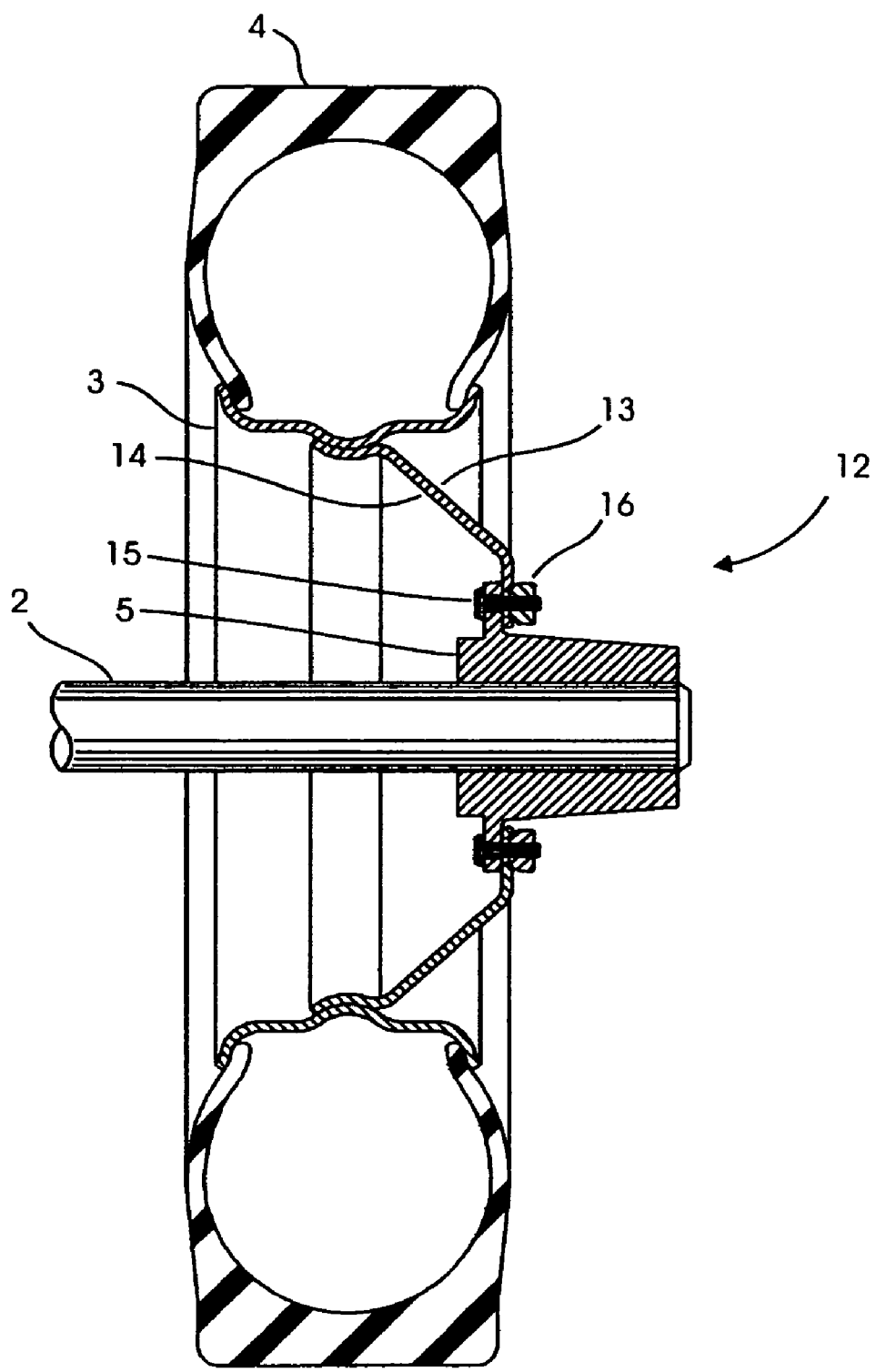
FIG. 2 is a sectional elevational view of one side of a single wheel assembly.

FIG. 2 shows one side of an axle (2) to which a single wheel assembly (12) is removably attached, comprised of a wheel (3) and tire (4) and a hub (5). With reference to FIG. 5, a hub (5) is shown, being comprised of a disk of sufficiently strong material of sufficient thickness, having an axle passage (32) from the inside face (33) through to the outside face (34) and having a means to removably secure it to the axle (2). Regularly spaced in the hub (5) around the axle passage (32) are stud passages (9) from the inside face (33) through to the outside face (34) and being so arranged around the axle passage (32) so as to align with stud holes (35) in the wheels (3), (7). The stud passage (9) has splines (18) machined into its face and so arranged as to mate with splines (19) on the stud so that the stud assembly (6), (15) is prevented from turning in the stud passage (9).

Figure 7:
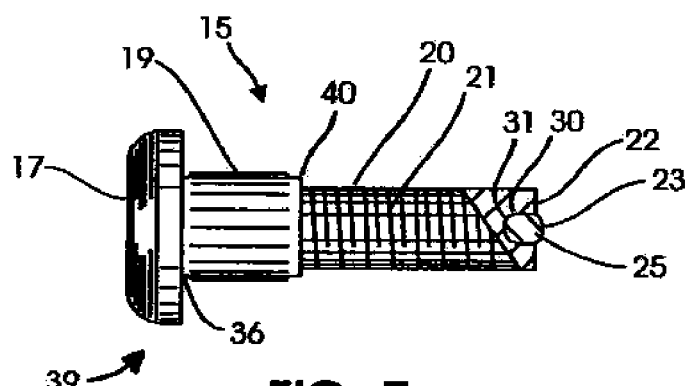
FIG. 7 is a side elevation partly in section of a preferred wheel stud for a single wheel assembly.

FIG. 7 shows a single wheel stud assembly (15) comprised of an elongated substantially cylindrical member, shank (40), having an enlarged stud head (17) at one end thereof, similar in shape to a bolt, of greater diameter than the diameter of the stud passage (9) in the hub (5). The diameter of the larger diameter section (36) of the cylindrical member of the stud (39) extending from the enlarged stud head (17) is of slightly smaller dimension than the inside diameter of the stud passage (9) and of length coincident with the distance from the inside face (33) to the outside face (34) of the hub (5) and has splines (19) on its outside circumference arranged laterally thereon and regularly spaced around its circumference so as to engage the splines (18) in the stub passage (9). Extending from the end of the larger diameter section (36) of the cylindrical member opposite the enlarged stud head (17) is a stud pin (20) of a slightly smaller diameter and having threads (21) throughout its length.

Figure 11:
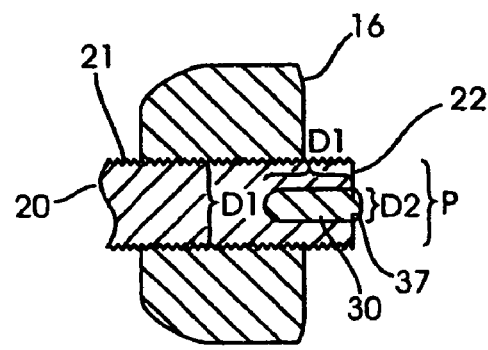
FIG. 11 is an expanded side cross sectional view of the stud pin section of the preferred stud assembly for a single wheel assembly.

The preferred embodiment of the invention and method for use is shown in FIGS. 7 and 11, wherein there is, at the end (22) of the stud pin (20), a plug cavity (30) continuing through the end (22) of the stud pin (20) and extending into the stud pin (20) along its center line, no more than the diameter of the threads (21) on the stud pin (20) ($D_1$), terminating in a spherical end (31) and having a diameter ($D_2$) of no more than 37.5% of the diameter of the threads (21) on the stud pin (20) ($D_2$=37.5% $D_1$), provided at least 5 threads (21) on the stud pin (20) extend beyond the lug (16) when properly torqued. Thus the maximum cross-sectional area (37) of the convex end of the stud insert (25) is determined by the formula (37)=$\sqrt{P.D_1}$ where P is the area of the threaded (21) end of the stud pin (22). The same formula applies for determining the maximum cross sectional area (37) of the convex end of the stud insert (23) in the plug cavity (24) in the enlarged stud head (17) for dual wheel assembly (1) application. The convex end of the stud insert (23) extends beyond the end (22) of the stud pin or the end of the enlarged stud head (17) so that the stud insert (25) can be staked during service, should the stud insert (25) become loose during normal service. The stud insert (25) is swaged into the plug cavity (30), (24) to keep it in place and provide electrical continuity between the stud insert (25) and the metal of the stud assembly (15), (6) and the metal of the wheel assembly (1), (12). Frequent inspection will be required to determine the security of the stud insert (25) and the rate it is sacrificed. This is the reason for the color of the stud insert (25) being clearly different than the color of the components of the wheel assembly (1), (12). In the preferred embodiment the stud insert (25) is made of zinc with the properties of Military Specification MIL-A-18001 J.

FIG. 2 shows the single wheel assembly (12) with the preferred embodiment of the single wheel stud assembly (15) as installed at one end of an axle (2).

Figure 6:
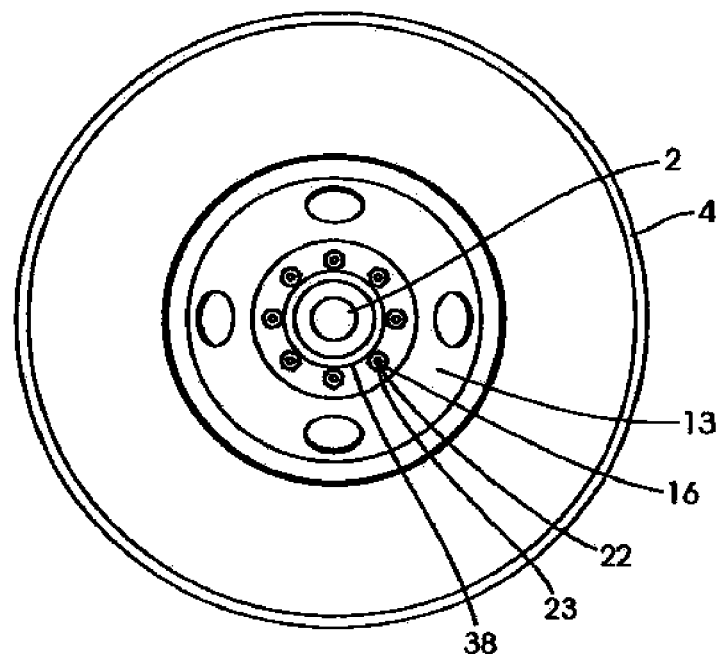
FIG. 6 is a front elevation of a single wheel assembly.

FIGS. 3 and 4 show a wheel (3), (7) with the center being spanned by a single plate (10) having a concave face (14) and the reverse side of the same having a corresponding convex face (13) and stud holes (35) there through regularly spaced around the circumference of the single plate (10) spanning the center of the wheel (3), (7) and so arranged as to accommodate the stud pins (20) installed in a hub (5). The center of the single plate has an opening (38) at its center of sufficient diameter to accommodate the axle (2). As shown in FIG. 6, in the single wheel assembly (12) configuration, the convex end (23) of the stud insert (25) is visible in the end (22) of the stud pin (20) with the wheel (3) installed on the hub (5) and the lug (16), or nut, properly torqued against the convex face (13) of the wheel (3).

In the circumstance, as shown in FIG. 1, where a dual wheel assembly (1) is used, the hub (5) has stud passages (9) of slightly smaller diameter to accommodate the smaller diameter of the spines (19) on the larger diameter section (36) of the cylindrical member of the stud (39) extending from the enlarged stud head (17). Similarly, the stud pin (20) has a slightly smaller diameter.

Figure 8:
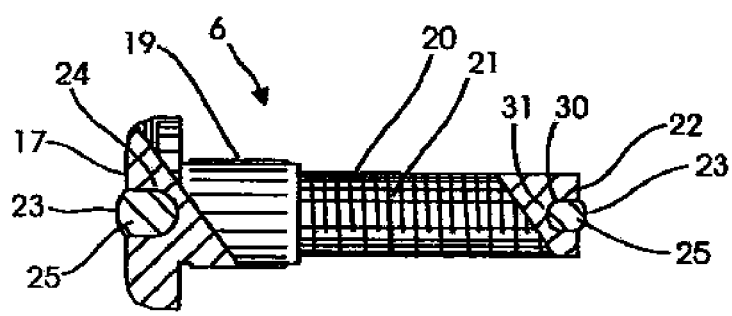
FIG. 8 is a side elevation partly in section of a preferred wheel stud for a dual wheel assembly.
Figure 9:
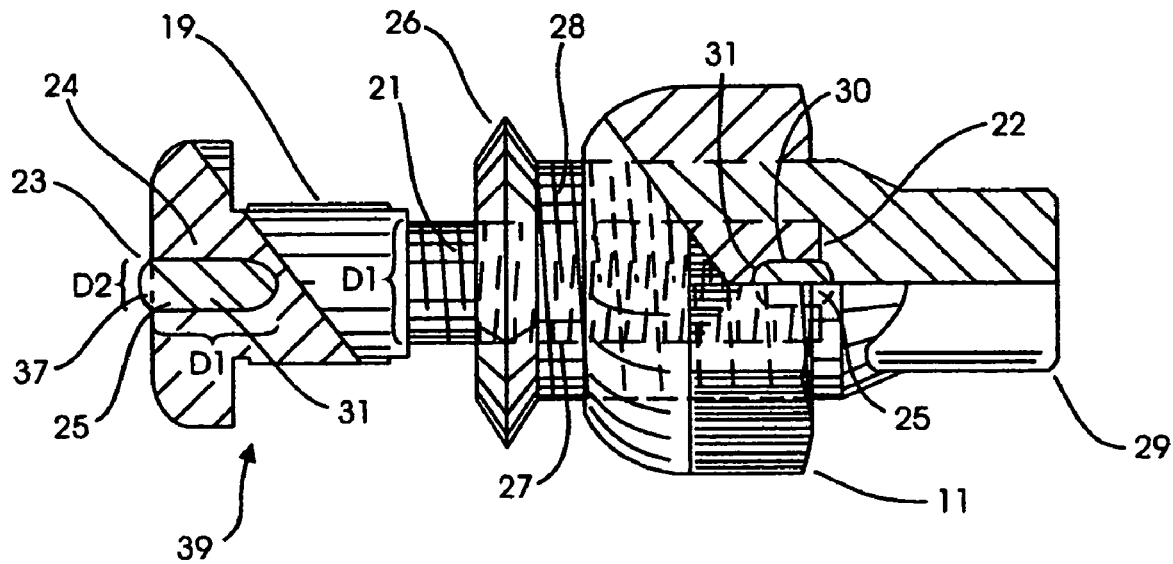
FIG. 9 is a side elevation partly in section of a preferred wheel stud for a dual wheel assembly with the dual threaded lug and dual over-lug.
Figure 10:
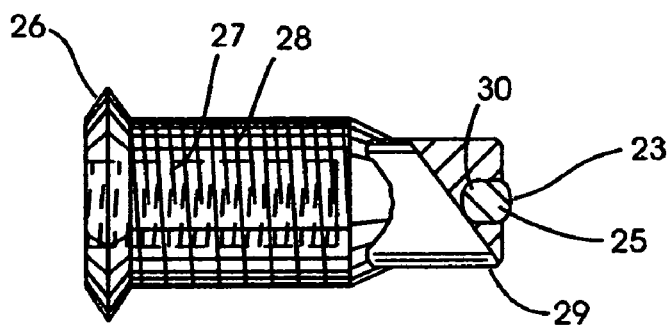
FIG. 10 is a side elevation partly in section of a preferred dual threaded lug.

With reference to FIGS. 8, 9, and 10, the components of the dual wheel stud assembly (6) are shown. The dual wheel stud assembly (6) is composed of a stud (39), a dual threaded lug (26) shown in FIG. 10, and a dual over-lug (11). The stud (39) is installed in the hub (5), as described above, and the inside wheel (3), with its concave face (14) toward the hub (5), is engaged on the hub (5) with the stud pins (20) extending through the stud holes (35). The dual threaded lug (26), having inside threads (27) and outside threads (28), is threaded on the stud pin (20) and tightened to the proper torque by means of its nut end (29) to secure the inside wheel (3) to the hub (5). Then the outside wheel (7), with its convex face (13) toward the hub (5), is engaged on the hub (5) with the dual threaded lug (26) extending through the stud holes (35). The dual over-lug (11) is threaded on the dual threaded lug (26) and tightened to the proper torque to secure the outside wheel (7) to the hub (5).

With reference to FIGS. 8, 9 and 10, the preferred embodiment of this invention for use with a dual wheel assembly is shown. Because the end of the stud pin (22) is covered by the dual threaded lug (26), the condition of the stud insert (25) in the end of the stud pin (22) is not available for easy visual inspection when the dual wheel assembly (1) is in operation. In addition, there are more communicating metal components in the dual wheel assembly (1), so that additional sacrificial material is needed to protect these metal components from corrosion and binding. Therefore, in the preferred embodiment, a plug cavity (24) is provided in the enlarged stud head (17), having the same relative dimensional limitation as the plug cavity (30) in the end of the stud pin (22), and the stud insert (25) also is provided with a convex end (23) to allow staking should the stud insert (25) become loose in operation. The condition of the stud insert (25) can be visually inspected without disassembling the dual wheel assembly (1). In addition, another plug cavity (30) may be provided in the nut end (29) of the dual threaded lug (26), maintaining the same relative dimensional limitation as the plug cavity (30) in the end of the stud pin (22).

Particular aspects provide a method of protecting from galvanic corrosion metal components of a wheel assembly, comprising assembling a single or dual wheel assembly, comprising a wheel and a hub, using at least one wheel stud assembly as described herein, or modifying at least one wheel stud of an existing single or dual wheel assembly by creating a cavity in a wheel stud thereof and inserting an insert therein, as described herein, whereby the assembled or modified single or dual wheel assembly is protected from galvanic corrosion. In certain embodiments, modifying at least one wheel stud of an existing single or dual wheel assembly by creating a cavity in a wheel stud comprises creating the cavity by drilling, casting or by casting and drilling.

As can be seen from the foregoing preferred and alternative embodiments of this invention, there is a central principle applied which involves a new and improved means and method of protecting metal components removably joined by means of a fastener from galvanic corrosion, wherein the fastener is provided with an integral, replaceable, sacrificial amount of metal, higher in the electromotive series than the metal of the assembly, and so located as to be readily seen upon inspection and replaceable without separating the assembly.

The foregoing disclosure and description of the invention are illustrative and explanatory thereof and, it will be understood by those skilled in the art, that various changes in the size, shape and materials, as well as in the details of the illustrated construction, may be made within the scope of the appended claims without departing from the scope or spirit of the invention.

We claim:

1. A metal fastener combination for removably securing two or more metal components together, comprising: a metallic shank; a metallic enlarged head formed integral with the shank at an end thereof; a threaded portion at the end thereof opposite to the enlarged head; a cavity in at least one of the metallic shank ends, the cavity extending into the metallic shank along its center line to a cavity end; and an insert located in the cavity, the insert comprising a metallic material higher in the electromotive series of metals than the metallic shank.

2. The metal fastener combination of claim 1, wherein the cavity has a cavity end that is spherically shaped or substantially so, wherein the extension of the cavity into the shank does not exceed a distance of about the diameter of shank threads, and wherein the cavity diameter does not exceed a width of about 37.5% of the diameter of the shank threads.

3. The metal fastener combination of claim 1, wherein the insert comprises zinc.

4. The metal fastener combination of claim 1, wherein the insert consists of zinc having the properties of Military Specification MIL-A 18001 J.

5. The metal fastener combination of claim 1, wherein the insert located in the cavity is externally visible therein.

6. The metal fastener combination of claim 5, wherein the insert protrudes in a visible convex face from the metallic shank.

7. The metal fastener combination of claim 5, wherein the insert is of a visibly different color than that of the metal fastener combination.

8. The metal fastener combination of claim 1, further comprising a securing means, nut means or lug means having complementary threads suitable to receive the threaded portion of the shank to provide a metal fastener combination having securing means, nut means or lug means.

9. The metal fastener combination having securing means, nut means or lug means of claim 8, further comprising two or more metal components secured together between the enlarged head of the metallic shank and the securing means, nut means or lug means, and wherein the metallic shank is in galvanic communication with the secured metal components to provide a metal fastener combination having securing means, nut means or lug means, and metal components secured thereby.

10. The metal fastener combination having securing means, nut means or lug means, and metal components secured thereby of claim 9, wherein the insert comprises a metallic material higher in the electromotive series of metals than the metal fastener, securing means, nut means or lug means, and the metallic components secured thereby.

11. A method for protecting metal components to be secured by a fastener combination from galvanic corrosion, comprising securing, using a metal fastener combination according to claim 8, two or more metal components together between the enlarged head and the securing means, nut means or lug means, wherein the metallic shank is in galvanic communication with the secured metal components to afford protection of the secured metal components from galvanic coffoslon.

12. The method of claim 11, further comprising; inspecting, periodically or otherwise, the insert for diminishment.

13. The method of claim 12, further comprising, where the inspected insert is determined to be diminished or loose, staking an externally visible face of the insert to secure the insert.

14. The method of claim 12, further comprising, where the inspected insert is determined to be diminished or loose, enhancing the insert by suitably combining additional insert material therewith.

15. The method of claim 14, wherein enhancing by combining is by swaging the additional insert material to the diminished or loose insert.

16. The method of claim 12, further comprising, where the inspected insert is determined to be diminished or loose, replacing the insert.

17. A single wheel stud assembly for removably securing a wheel assembly, comprising: a stud having an enlarged head at one end, an elongated, substantially cylindrical metallic shank with a splined section, extending from the enlarged head and having lateral splines around the circumference thereof suitable to engage complementary stud passages in a hub, threads along at least a portion of the remainder of the shank opposite to the enlarged head end to provide a stud pin; a lug in removable communication with the threads on the stud pin, and capable of being torqued against components to be secured; a cavity in the threaded end of the stud pin, the cavity extending into the metallic shank along its center line to a cavity end; and an insert located in the cavity, the insert comprising a metal material higher in the electromotive series of metals than other components of the wheel stud assembly.

18. The single wheel stud assembly of claim 17, wherein the cavity has a cavity end that is spherically shaped, wherein the extension of the cavity into the shank does not exceed a distance of about the diameter of shank threads, and wherein the cavity diameter does not exceed a width of about 37.5% of the diameter of the shank threads.

19. The single wheel stud assembly of claim 17, wherein the insert comprises zinc combinations thereof.

20. The single wheel stud assembly of claim 17, wherein the insert consists of zinc having the properties of Military Specification MIL-A- 18001 J.

21. The single wheel stud assembly of claim 17, wherein the insert located in the cavity is externally visible therein.

22. The single wheel stud assembly of claim 21, wherein the insert protrudes in a visible convex face from the stud pin.

23. The single wheel stud assembly of claim 21, wherein the insert is of a visibly different color than the stud pin.

24. The single wheel stud assembly of claim 17, wherein a maximum cross-sectional area of the cavity is determined by the formula $\sqrt{P}$ times the diameter of the threads, where P is the area of the threaded end of the stud pin, provided that at least 5 threads on the stud pin extend beyond the lug when it is properly torqued.

25. The single wheel stud assembly of claim 17, further comprising a wheel and a hub having stud passages, secured together between the enlarged head and the lug, and wherein the metallic shank is in galvanic communication with the secured components.

26. The single wheel stud assembly of claim 25, wherein the insert comprises a metallic material higher in the electromotive series of metals than the stud pin, lug, and the components secured thereby.

27. A method of protecting from galvanic coffosion metal components of a wheel assembly, comprising assembling a single or dual wheel assembly, comprising a wheel and a hub, using at least one wheel stud assembly according to claim 17 or claim 36, respectively, or modifying at least one wheel stud of an existing single or dual wheel assembly by creating a cavity in a wheel stud thereof and inserting an insert therein, the cavity and insert according claim to 17 or claim 36, respectively, whereby the assembled or modified single or dual wheel assembly is protected from galvanic coffosion.

28. The method of protecting of claim 27, further comprising: inspecting, periodically or otherwise, the at least one insert for diminishment.

29. The method of claim 28, further comprising, where the inspected insert is determined to be diminished or loose, staking the externally visible face of the insert to secure the insert.

30. The method of claim 28, further comprising, where the inspected insert is determined to be diminished or loose, enhancing the insert by suitably combining additional insert material therewith.

31. The method of claim 30, wherein enhancing by combining comprises swaging the additional insert material to the diminished or loose insert.

32. The method of claim 28, further comprising, where the inspected insert is determined to be diminished or loose, replacing the insert.

33. The method of claim 27, wherein, in the case of modifying at least one wheel stud of an existing single or dual wheel assembly by creating a cavity in a wheel stud thereof, creating the cavity is by drilling.

34. The method of claim 27, wherein, in the case of modifying at least one wheel stud of an existing single or dual wheel assembly by creating a cavity in a wheel stud thereof, creating the cavity is by casting, or by casting and drilling.

35. The method of claim 27, wherein, in the case of modifying at least one wheel stud of an existing single or dual wheel assembly by creating a cavity in a wheel stud thereof and inserting an insert therein, insertion of the insert into the cavity is by swaging.

36. A dual wheel stud assembly for removably securing a dual wheel assembly, comprising: a stud having an enlarged head at one end, an elongated, substantially cylindrical metallic shank with a splined section extending from the enlarged head and having lateral splines around the circumference thereof and suitable to engage complementary stud passages in a hub, threads along at least a portion of the shank-opposite to the enlarged head end to provide a stud pin; a dual-threaded lug having inside threads suitable in operation to engage the threads on the stud pin against an inner wheel, and having outside threads, the dual-threaded lug extending a sufficient distance beyond the end of an engaged stud pin to accommodate a second wheel, and having a nut end to facilitate torquing the dual-threaded lug to removably secure an inner wheel; a dual over-lug that engages the outside threads of the dual-threaded lug and is torquable thereon to removably secure an outer wheel; a cavity in at least one of the enlarged-head end of the stud and the nut end of the dual-threaded lug, the cavity extending into the metallic shank, or lug, respectively, along its center line to a cavity end; and an insert located in the at least one cavity, the insert comprising a metal material higher in the electromotive series of metals than those of the stud pin or lug.

37. The dual wheel stud assembly of claim 36, wherein the at least one cavity has a cavity end that is spherically shaped, wherein, in the case of a enlarged stud head end cavity, the extension of the cavity into the shank does not exceed a distance of about the diameter of the stud pin threads, and the cavity diameter does not exceed a width of about 37.5% of the diameter of the stud pin threads, and wherein, in the case of a cavity in the nut end of the dual-threaded lug, the extension of the cavity into the lug does not exceed a distance of about the diameter of threads on the dual over-lug, and the cavity diameter does not exceed a width of about 37.5% of the diameter of the threads on the dual over-lug.

38. The dual wheel stud assembly of claim 36, wherein the at least one insert comprises zinc.

39. The dual wheel stud assembly of claim 36, wherein the at least one insert consists of zinc having the properties of Military Specification MIL-A- 18001 J.

40. The dual wheel stud assembly of claim 36, wherein the at least one insert located in the at least one cavity is externally visible therein.

41. The dual wheel stud assembly of claim 40, wherein the at least one insert protrudes in a visible convex face from the metallic shank.

42. The dual wheel stud assembly of claim 40, wherein the at least one insert is of a visibly different color than that of at least one of the stud pin, the lug, and the over-lug.

43. The dual wheel stud assembly of claim 36, wherein a maximum cross-sectional area of the cavity is determined by the formula $\sqrt{P}$ times either the diameter of the stud pin threads in the case of an enlarged stud head end cavity, or the diameter of the dual over-lug threads in the case of a cavity in the nut end of the dual-threaded lug, where P is the area of the respective threaded end, provided that at least 5 threads on the stud pin extend beyond the lug when it is properly torqued.

44. The dual wheel stud assembly of claim 36, further comprising inner and outer wheels and a hub having stud passages, secured together between the enlarged head and the over-lug, and wherein the metallic shank is in galvanic communication with the secured components.

45. The dual wheel stud assembly of claim 44, wherein the at least one insert comprises a metallic material higher in the electromotive series of metals than the stud pin, the lug, the over-lug, and the components secured thereby.

* * * * *